United States Patent [19]
Hunt

[11] 3,906,297
[45] Sept. 16, 1975

[54] METALLIZED FILM CAPACITOR AND METHOD OF MANUFACTURE THEREOF

[75] Inventor: Delbert E. Hunt, Ogallala, Nebr.

[73] Assignee: TRW Inc., Los Angeles, Calif.

[22] Filed: July 10, 1974

[21] Appl. No.: 487,249

[52] U.S. Cl. ................ 317/258; 29/25.42; 317/260
[51] Int. Cl.² .................... H01G 1/14; H01G 13/00
[58] Field of Search .......... 317/258, 260; 29/25.42; 219/85 F

[56] References Cited
UNITED STATES PATENTS

| | | | |
|---|---|---|---|
| 3,058,040 | 10/1962 | Wellington | 317/260 |
| 3,060,356 | 10/1962 | Beyer | 317/260 |
| 3,128,649 | 4/1964 | Avila | 219/85 F |
| 3,239,720 | 3/1966 | Rayburn | 317/260 |
| 3,256,472 | 6/1966 | Centurioni | 317/260 |
| 3,263,057 | 7/1966 | Conti | 219/85 F |

FOREIGN PATENTS OR APPLICATIONS

| | | | |
|---|---|---|---|
| 231,594 | 7/1944 | Switzerland | 317/260 |

Primary Examiner—E. A. Goldberg
Attorney, Agent, or Firm—Miketta, Glenny, Poms & Smith

[57] ABSTRACT

An improved lead wire connection or termination is disclosed for metallized film capacitors. Capacitors of this type are formed by winding thermoplastic dielectric films, each having a metallized surface into a tight coil and applying conductive metal electrodes to the opposite axial ends thereof to form an electrical bond with the metallized surfaces of the dielectric windings. To minimize damage to this electrical bond during the attachment of lead wires to the axial end electrodes, an improved lead wire configuration and method of attaching such wire to each end electrode is provided. Capacitors manufactured in this manner exhibit a lower overall electric resistance and a correspondingly lower dissipation factor.

13 Claims, 16 Drawing Figures

PATENTED SEP 16 1975

METALLIZED FILM CAPACITOR AND METHOD OF MANUFACTURE THEREOF

BACKGROUND

In general, the present invention relates to electrical capacitors and methods of manufacture thereof. More particularly, this invention concerns improvements in the construction and manufacture of the type of capacitors formed by plural windings of metallized thermoplastic films or sheets.

This particular class of devices is sometimes referred to as metallized thermoplastic capacitors. Briefly, they are formed by first applying a coating of a good conductive metal to one surface of each of a pair of elongate stretches of thermoplastic film or sheet material. Along opposite edges, each such film is provided with an unmetallized or uncoated margin so that the films may be wound together in a bifilar configuration with the dielectric film spacing and insulating the metallized surfaces from direct contact. The metallized and conductive surface of each film is exposed at one axial end of the wound body for receiving the opposed electrodes of the capacitor applied by means of a molten metal spray. The sprayed electrodes bond to the metallized film edges of only one of the dielectric films at each axial end with the unmetallized margin of the other film serving as an insulator between the two electrodes.

Heretofore, it has been the practice to attach lead wires, or "pigtails" as they are sometimes called, to each end of the capacitor by forming a circular-shaped head on the lead wire and concentrically soldering such circular head to the axial end electrodes. With this construction, the coaxial relationship between the circular head of the lead wire and the circular pattern of the film edges at each axial end of the wound body disposed the path of the circular lead head to be in registration with the edges of a number of windings of the underlying film. It has been found that capacitors made in this manner and using a thermoplastic film having a relatively low melting point exhibit a lower electrical efficiency than expected. The electrical efficiency in this context refers to the dissipation factor of a capacitor which may be measured as the ratio of the effective series resistance of the capacitor to the capacitive reactance. As the effective series resistance of the device increases, a larger dissipation factor is incurred accompanied by an overall loss in efficiency.

SUMMARY OF THE INVENTION AND ITS OBJECTIVES

In accordance with this invention, it has been discovered that during the attachment of the lead wires to the end electrodes of the capacitor there occurs a certain amount of damage to the electrical connection or interface between the sprayed metal electrodes and the metallized surfaces of the dielectric windings. In general, the disruption or damage to this electrode to metallized surface interface occurs in regions adjacent to the circular head of the lead wire and is caused by a slight to moderate melting of the thermoplastic dielectric during soldering or resistance welding of the lead wire head. As a result of the interface damage, a number of the metallized dielectric windings form only a high resistance connection or junction with the axial end electrodes to which the lead-in wires are bonded. Thus for electrical current to reach the disassociated windings, it must flow through the high resistance junction and/or from the edges of adjacent, undamaged windings through the metallized film surface of one or more windings. This increases the effective series resistance of the capacitor and decreases its efficiency.

Accordingly, it is one object of the present invention to minimize the additional resistance and commensurate loss in efficiency caused by damage to the electrode to metallized surface interface during conventional soldering or resistance welding of the lead-in wire to the end electrodes for this type of capacitor.

More particularly, it is an object of the present invention to provide a method of manufacture of metallized thermoplastic film capacitors in which the lead wires are applied to the ends of the capacitor in a manner which results in a minimum effective series resistance of the completed capacitor component with a corresponding low dissipation factor.

Briefly, these objectives are achieved in accordance with the invention disclosed herein by applying the lead wire so that it extends substantially radially with respect to the edges of the individual coil windings at each axial end of the wound metallized film and bonding the lead wires to the metal end electrodes using a minimum amount of heat and localizing such heat to the immediate vicinity of the lead wire to electrode junction. Any heat damage to the interface between the electrode and metallized surfaces of the thermoplastic windings is substantially coextensive with the radial path of the lead-in wire junction. As such, the damage to an interface for any given winding is of limited circumferential extent. In other words, none of the winding interfaces are damaged for the full or even major portion of their circumferential extent because of the substantial radial path of the lead-in wire junction. This construction has been found to result in a far more effective electrical termination at each end of the capacitor body with a marked reduction in the effective resistance and dissipation factor of the capacitor.

These and further objects and various advantages of the capacitor made in accordance with the present invention will become apparent to those skilled in the art from a consideration of the following detailed description and appended drawings of several exemplary embodiments thereof.

DRAWINGS

Figure 5A:
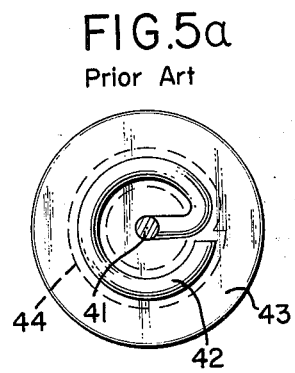

FIGS. 5a, b and c are top, section and detail views respectively of a metallized thermoplastic film capacitor constructed in accordance with the prior art process.

Figure 6A:
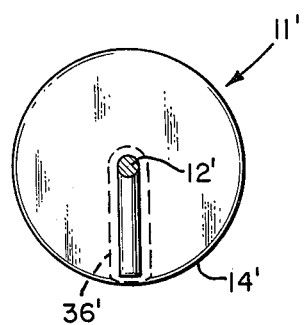

FIGS. 6a, b and c are views similar to FIGS. 5a, b and c although showing in this instance a capacitor manufactured in accordance with the preferred construction and process of one preferred embodiment of the present invention.

Figure 7:
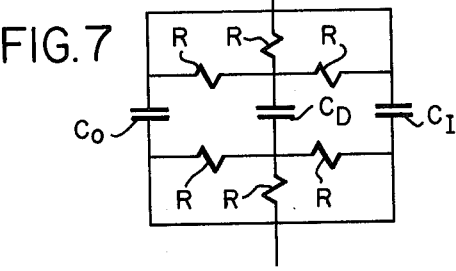

FIG. 7 is a schematic diagram representing an equivalent electrical circuit including the effective resistance and capacitive parameters of the device.

Figure 8:
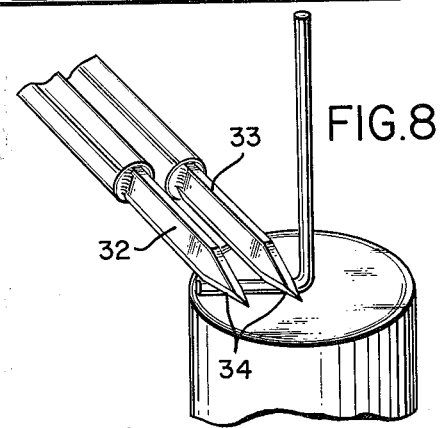

FIG. 8 is a perspective view illustrating a preferred procedure for resistance welding or soldering the lead wire in place.

Figure 9A:
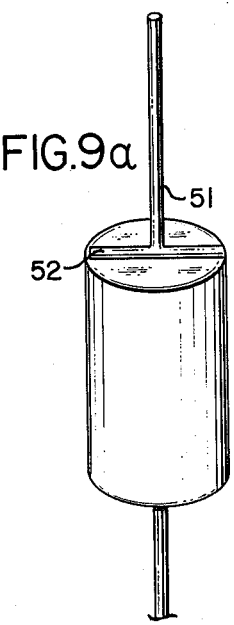

FIGS. 9a, b, c and d are perspective views illustrating alternative preferred embodiments of the present invention.

With reference to FIGS. 1 through 4 of the drawings, one preferred embodiment is shown for terminating a wound metallized thermoplastic film capacitor 11 into a pair of lead wires or pigtails 12 and 13. The capacitance per se is formed by exceedingly thin, metallized surfaces of the thermoplastic films which are in this instance wound into a cylindrical body 14. Lead wires 12 and 13 serve as a means for terminating or connecting this capacitance into an electrical circuit.

Figure 3:
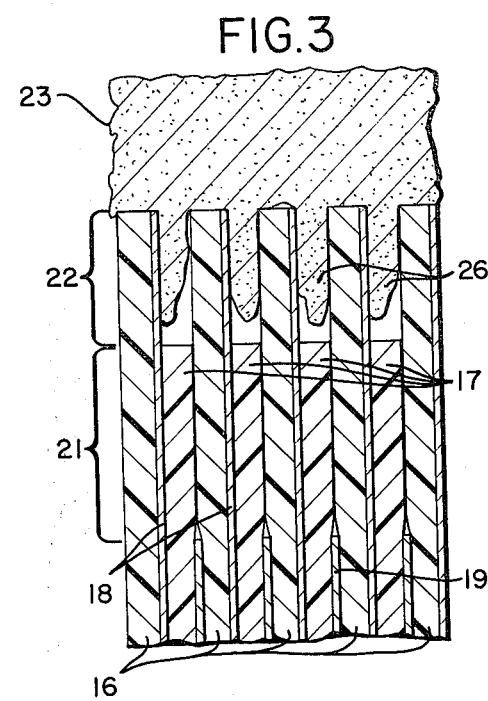
FIG. 3 is an enlarged, section view of one portion of the capacitor shown in FIGS. 1 and 2 taken along section lines III—III of FIG. 2.
Figure 4:
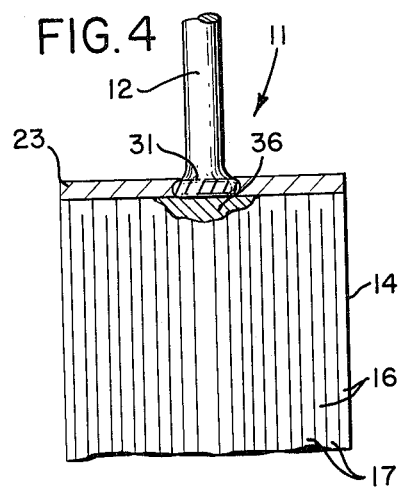
FIG. 4 is a section view of the capacitor taken generally along lines IV—IV of FIG. 2.

With reference to FIG. 3, body 14 is in this instance composed of two dielectric sheets or films 16 and 17 wound together on a mandrel, each film 16 and 17 having one of its surfaces metallized to form the opposite poles of the capacitor. Here, dielectric film 16 has one of its surfaces formed with a metal coating 18 while the other film 17 has a similar metal coating 19. Although additional dielectric films, tissues or other layers and further metallized surfaces or metallic foils may be employed, in this illustration the capacitor body 14 is formed by just the pair of dielectric films each carrying a metallized surface. For each film, a relatively narrow, unmetallized margin is provided along one of the edges of each film, for example shown as margin 21 for dielectric film 17 in FIG. 3. Although not shown, film 16 similarly is provided with an unmetallized margin along its edge opposed to margin 21. The metallized dielectric films are wound in a bifilar fashion by overlaying the films so that the metallized surfaces formed by coatings 18 and 19 are always separated by the thickness of one of the dielectric sheets. Also during winding, the metallized edge of one of the sheets, in this instance film 16 and coating 18, overlie the unmetallized margin of the other dielectric film, in this instance film 17 and margin 21. An axial offset may be provided in the registration of the two films, such as shown in FIG. 3, so that the dielectric having the full metallized edge, in this instance film 16, protrudes slightly axially beyond the unmetallized edge of the adjacent dielectric, in this instance film 17. This results in the axial offset 22 as best shown in FIG. 3. The opposite axial end of body 14 will appear identical to the section shown in FIG. 3 with the relative positions of films 16 and 17 reversed such that film 17 and its metal coating 19 will axially protrude beyond the unmetallized edges of film 16.

Figure 1:
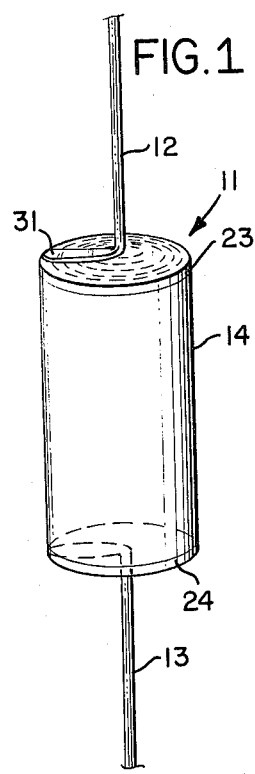
FIG. 1 is a perspective view of a wound, metallized film capacitor constructed in accordance with one preferred embodiment of the present invention.
Figure 2:
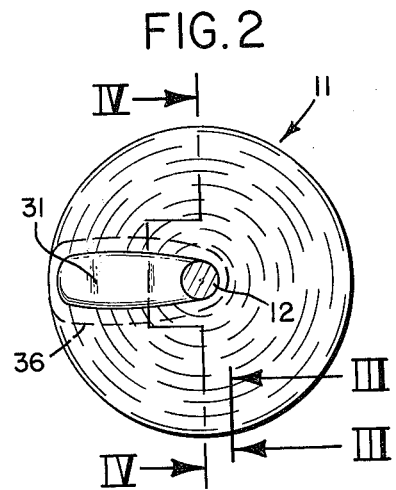
FIG. 2 is a top plan view of the capacitor shown in FIG. 1.

After winding capacitor body 14, it is necessary to provide means for electrically terminating or attaching leads to the metallized windings. Usually, this is accomplished by first applying conductive metal electrodes to each axial end of body 14 with the electrodes serving as an electrical and mechanical intermediary to which lead conductors or pigtails may be soldered. In the present case, the axial end electrodes 23 and 24 as shown in FIG. 1 are applied by spraying a molten metal directly onto the exposed film windings at each axial end of body 14. Preferably, the metal forming electrodes 23 and 24 has a melting point which is relatively low, for example in the range of 440°–550°F. and a characteristically low heat conduction. In selecting the material for these electrodes, it is important to provide a melting point selected relative to the melting point of the thermoplastic film forming the dielectric portion of the windings. For thermoplastic films having a relatively low melting point for example in the range of 250°–360°F., it is desirable to employ an electrode metal which is near the low end of the aforementioned range. The reason for this is twofold. First, when the molten electrode metal is applied to the ends of body 14, a higher melting point metal will directly damage the exposed dielectric windings by softening and/or melting the thermoplastic film. Secondly, and as more fully explained herein, when the lead wires are bonded to the electrodes 23 and 24, the higher melting point metals will require proportionately higher heat to form a good solder junction between the lead and electrode. Excessive heat during the attachment of the leads has been found to cause damage to the electrode to metallized interface with a consequent increase in the effective resistance of the component.

More particularly with reference to FIG. 3, the process for applying electrodes 23 and 24 by a sprayed molten metal is sometimes referred to as "schooping." As shown for electrode 23 in FIG. 3, the schooping process results in the buildup of a metal coating which penetrates into the free space regions between the windings formed by axial offset 22. This forms a good electrical bond or interface between the schooped electrode 23 and the metallized surface, in this instance coating 18 of dielectric film 16. FIG. 3 shows the formation of fingerettes 26 of the schooping material of electrode 23 extending into and contacting the metal coating 18 adjacent the edges of thermoplastic film 16. It is the electrical connection and bond between the metal of electrode 23 and the metallized surfaces of the dielectric film in this interface region which must be preserved during the attachment of the lead wires in order to avoid an increase in the effective resistance of the component and an accompanying increase in the dissipation factor.

Having applied the axial end electrodes 23 and 24 and achieving a good uniform electrical bond or contact with the metallized surfaces of the thermoplastic film, the next step is to attach the lead wires 12 and 13. In order to minimize the effect of any disruption in the electrical bond or interface between each of electrodes 23 and 24 and the associated metal coating of the dielectic films, each lead wire is shaped and attached as follows. First, the conductor lead is provided with at least one elongate portion positioned on the associated end electrode so as to extend substantially radially with respect to the film windings. Stated differently, the elongate portion of the lead wire should cut across the metallized edges of the wound dielectric film in a generally, radially tending direction, and should not circumferentially follow anyone or more windings for more than approximately 90° or a quarter of the full circumference of such windings. For capacitors having sufficient dimension at their axial ends, preferred electrical efficiency is achieved with L-shaped lead wires as shown for capacitor 11 in FIGS. 1 through 4.

In particular with respect to lead wire 12, this L configuration provides an elongate foot portion 31 which may be arranged as shown to extend radially outwardly from a position near or at the center of the axial end of electrode 23 to the outer circumferential edge of the electrode. This position the main bodies of leads 12 and 13 so as to extend outwardly from the capacitor along the axis of body 14.

With each of the lead wires so formed and positioned, the elongate foot portion is now mechanically and electrically soldered, welded or otherwise bonded to the schooped electrodes 23 and 24. Although conventional soldering may be employed to attach the leads, best results have been obtained by a resistance welding or soldering technique. This operation is illustrated in FIG. 8 wherein a pair of spaced apart tungsten electrodes 32 and 33 having a controlled voltage applied thereto are positioned on the foot or other elongate portion of the lead wire. Near-shape edges 34 of blades 32 and 33 slightly cut into the surface of the lead wire as shown and the application of the voltage causes a quick, localized heating of both the lead wire metal and the schooped electrode metal. A solder pool is formed in the vicinity of the lead wire to electrode junction and the welding current is cut off to allow the molten metal to solidify and form a positive electrical and mechanical bond between the parts. This procedure results in the use of a minimum amount of heat and the localizing of such heat. Also, the foot portion 31 of the lead wire may be flattened slightly as shown to cause a more rapid melting of the foot into the electrode 23 and to improve the strength of the bonded lead.

Even with the above-described procedure for soldering the lead wires in place, there is an unavoidable destruction of degradation of the electrical interface between the schooped metal electrodes and the metallized film surfaces in the region or vicinity at which the lead-in wire portion is heat bonded or welded to the schooped electrode. In other words, the application of heat during the soldering or welding of the lead-in wire foot 31 in the embodiment of FIGS. 1 through 4 causes damage to this interface in the region 36 best shown in FIGS. 2 and 4. In this region, the localized heat from the welding of the lead wire in place causes either softening or melting of the thermoplastic dielectric. This results in the metallized surface or coating, which is exceedingly thin, to be wholly or partially dispersed into the softened or melted thermoplastic dielectric. A high resistance junction is formed between the schooped electrode, such as electrode 23, and the metallized surface of the dielectric windings, such as metal surface coating 18 on dielectric film 16. This high resistance junction underlies the path of the lead-in wire junction to the schooped electrode. With the elongate lead wire portion extending substantially radially with respect to the axial end of body 14, the extent of the disassociation or disconnection of electrode 23 to the metallized surface is limited to a number of relatively small, discrete points or gaps along the edge of the winding. These small, dispersed regions of high resistance are, moreover, electrically bridged through the immediate connection of adjacent, undamaged, relatively low resistance interfaces outside the radial path of the lead wire connection.

Figure 5B:
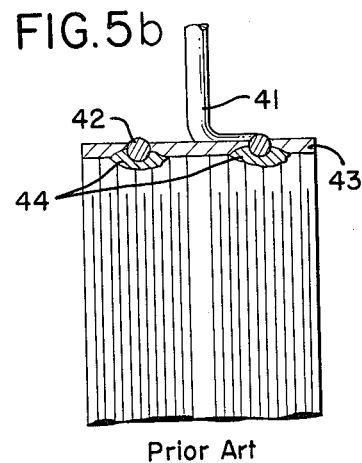
Figure 5C:
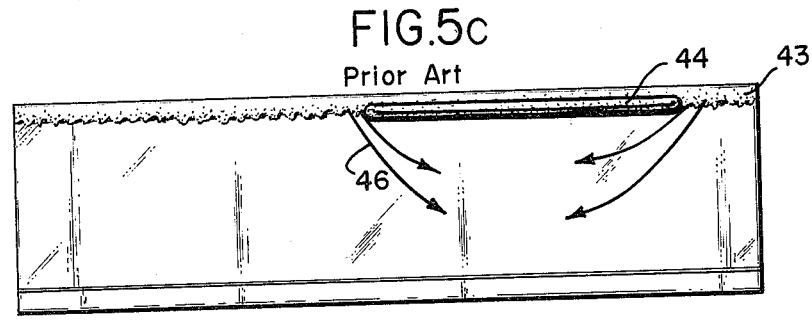
Figure 6B:
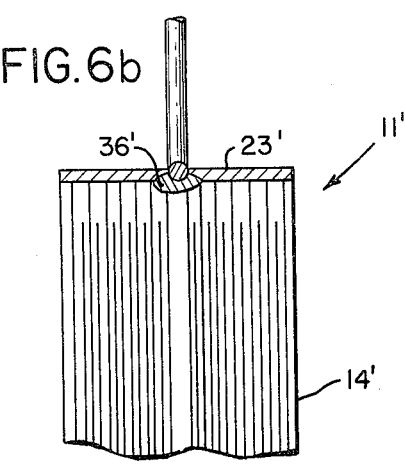
Figure 6C:
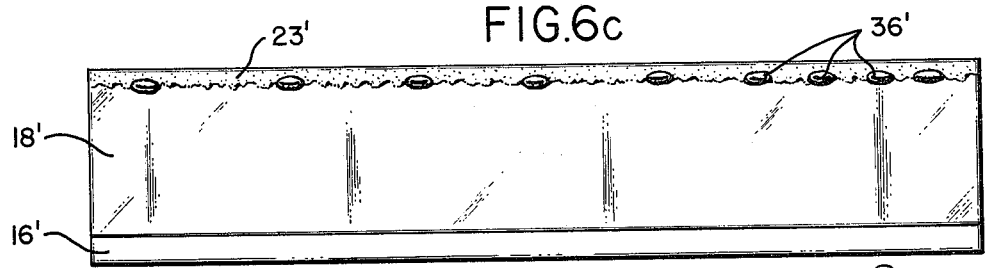

The marked improvement in the capacitor manufactured by this method versus the prior art method is dramatically shown by comparing the prior art structure shown in FIGS. 5a through 5c with the present capacitor construction shown in FIGS. 6a through 6c. Heretofore, thermoplastic capacitors of this type have been terminated by lead wire configurations selected principally for mechanical strength. FIG. 5a shows a top plan view of a prior art lead wire 41 having a circular shaped head 42 soldered or otherwise bonded to the metal electrode at the axial end of the wound capacitor body. Although this construction does result in a good mechanical attachment of the lead wire, it also results in a serious impairment to the electrical interface between the metal end electrode and the metallized surface of the dielectric. The circular configuration of lead wire head 42 when centered with respect to each axial end of the capacitor body as is the practice results in a number of concentric film windings or layers lying directly under the circular path of the head 42. When head 42 is heat bonded or soldered to the metal electrode 43, these numerous concentric windings of the dielectric film fall within the high resistance, damaged zone 44 underlying circular head 42. Since the width of the zone 44 may encompass numerous layers or windings of the film, a substantial section of the total length of the film may be left either unconnected to electrode 43 or only partially connected thereto through a high resistance.

This result is best illustrated in FIG. 5c showing the full, uncoiled length of a film winding with a substantial portion of the overall length exhibiting a continuous uninterrupted impaired electrode to metal surface interface or zone 44. In order for those portions of the metallized surface adjacent region 44 to be electrically effective, current must flow over the paths indicated by arrows 46 from remotely located, undamaged electrode to metallized surface interfaces. Because of the exceedingly thin coatings of metal which form the metallized dielectric surfaces, any unnecessary current flow along these surfaces increases the effective resistance of the capacitor.

With reference to FIGS. 6a through 6c, an entirely different result is achieved by the lead wire configuration according to the present invention. Here, using primed reference numerals to designate corresponding unprimed reference parts in FIGS. 1 through 4, the lead wire 12' is connected to the capacitor electrode so as to extend substantially radially with respect to the axial ends of the device. When the impaired or high resistance region 36' is examined on the full, uncoiled length of metallized dielectric 16' as in FIG. 6c, the following will be observed. The high resistance areas are mere points or relatively small localized areas dispersed at intervals along the full length of the winding. Each region 36' in FIG. 6c is bridged by immediately adjacent, undamaged low resistance interfaces between the schooped electrode 23' and the metallized surface or coating 18'. The entire length of the metallized surface 18' is directly electrically energized through electrode 23' without requiring any significant current flow along the length of the winding. Additionally, by radially extending the lead wire connection as shown, the lead conductor electrically bridges across any inter-winding discontinuities in electrode 23' resulting from an improperly applied electrode spray or resulting from an abnormal weave along an axial edge of the winding.

To illustrate how the electrical functioning of the capacitor is impaired by the added internal resistance due to the prior art construction of FIGS. 5a through 5c, an equivalent electrical circuit of the capacitor is shown in FIG. 7. The capacitor $C_o$ represents the capacitance in the outer turns of the body winding. The capacitance represented by capacitor $C_D$ is that of the winding turns contiguous with the damaged interface 44 as shown in FIG. 5c. Capacitance $C_I$ represents the capacitance of the inner windings. The various resistors R represent the high resistance junction at the damaged interface and the additional resistance required by circulating currents along the thin metallized surface. It is these resistances which are markedly reduced by the capacitor constructed in accordance with the present invention. Although the reduction in the effective series resistance of the device and the associated reduction in the dissipation factor is noticeable over a wide range of frequencies, it is especially advantageous at the higher end of the frequency range for which the device is intended.

As stated above, the present invention is particularly advantageous for thermoplastic films having a relatively low melting point with respect to the melting point of the schooped electrode metal. The capacitor construction and method disclosed herein has been particularly successful for capacitors using a polypropylene dielectric film with metallized surfaces of aluminum or zinc. Polypropylene has a melting point at around 320° F. which is exemplary of a thermoplastic film former having a relatively low melting temperature.

It has been found preferable to employ a schooping material in conjunction with polypropylene having a melting point of around 450° F. For the schooping material, a molten spray of one of the lower melting point babbit alloys may be used. These soft alloys have good bonding properties and are available with a melting point temperature in the aforementioned range. In particular, a schooping metal commercially available under the designation Spray Babbit A having a melting point of approximately 446° F. has been found entirely satisfactory for the polypropylene film.

For thermoplastic films having a relatively higher melting point such as polycarbonate, polyethylene terephthalate and others capable of being extruded into a film, a commensurately higher melting point schoop material may be employed. For example under some conditions, zinc which has a melting point in the neighborhood of 790° F. may be used for the "schooping" on relatively higher melting point thermoplastics. However, zinc has a relatively higher heat conduction characteristic than the babbit alloy noted above and is thus more likely to cause damage to the electrode to metallized surface interface by conducting the soldering heat during mounting of the lead wire to the sensitive interface. Thus, although it is possible to use metals lying at the higher end of the aforementioned melting point range for the schooped electrode, it is preferable to employ those at the lower end of the range. Other schooping metals include solder, aluminum and copper.

Other thermoplastic materials sometimes used for metallized capacitors include polystyrene, polyethylene and polysulfone.

Usually, the metallized surface of the thermoplastic film is applied by evaporating extremely thin coatings, on the order of one tenth of one thousandths of an inch or less. Typical metallizing materials include aluminum and zinc. In some cases, separate metal foils, for example aluminum foil, may be wound together with the thermoplastic film to achieve the inner metallized electrodes or surfaces of the capacitor body.

After winding the metallized thermoplastic films on a mandrel, many conventional processes require a heat treatment or heat shrinking operation. This step in the processing takes place before the application of the schooped electrodes and improves the stability of the final capacitor.

After the heat treatment or heat shrinking operation and after schooping, the end sections or axial ends of the capacitors body, the component is ready to receive the lead wires in the manner described above.

Although the embodiment of the invention shown in FIGS. 1 through 4 has been found advantageous for most capacitors, other embodiments of the invention are illustrated in FIGS. 9a–9d. It is observed in each case that the bonded or soldered portion of the lead wire extends substantially radially with respect to the axes of the windings. In FIG. 9a, a T-shaped lead wire 51 is used having a head portion 52 which extends radially or diametrically from one outer circumference of the windings to the other circumference. As in the case of the single foot or L-shaped configuration of FIGS. 1–4, this lead wire structure provides a minimum disruption of the electrode to winding interface by leaving major circumferential portions of the interface intact.

Figure 9B:
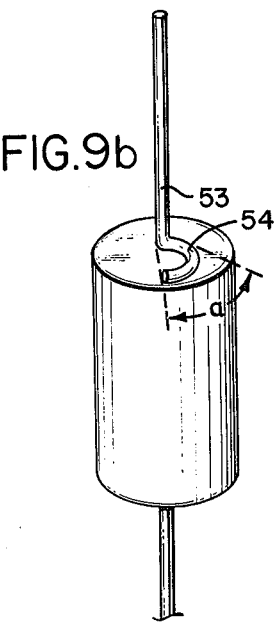

The construction of FIG. 9b has been found particularly suitable for smaller diameter capacitors where the L-shaped lead may be slightly lacking in mechanical strength. In this case, the lead 53 is formed with a "quarter round" or sometimes called a U-shaped head 54. Head 54 is positioned so as to be offset from the center of the capacitor body so that the head lies substantially in a single quadrant of the full circle end electrode. Thus, although a minor portion of head 54 may parallel a very slight portion of the concentric windings, this relationship is limited to less than one-quarter or one quadrant of the full 360° circumference of the paralleled windings. The offset quarter round head 54 thus subtends an angle a of less than 90° with respect to the axis of the capacitor body to maintain intact the electrode interface for the major portion of the circumference of anyone or more windings. In this respect, the provision of a lead wire portion which extends substantially radially with respect to the concentric windings shall refer to any lead wire portion at least part of which is radially extending and in which no part or section thereof parallels one or more concentric windings for more than 90° about the winding circumference.

Figure 9C:
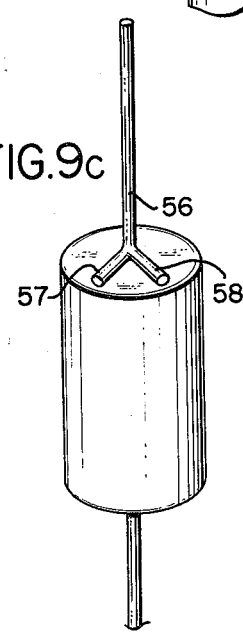

FIG. 9c illustrates still another embodiment in which a lead wire 56 includes a pair of angularly set radially extending foot portions 57 and 58 with each foot portion extending from the axial center of the capacitor body to an outer circumferential edge.

Figure 9D:
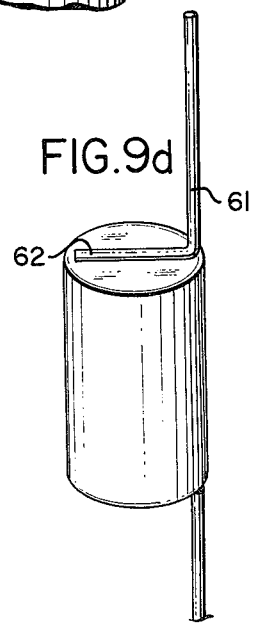

FIG. 9d employs another variation of the L configuration with the lead wire 61 in this instance having an elongate foot portion 62 which extends across the diameter of the end electrode with the main portion of the leads extending away from the capacitor body in an axial offset arrangement.

While only a limited number of embodiments of the present invention have been disclosed herein, it will be readily apparent to persons skilled in the art that certain changes and modifications may be made thereto without departing from the spirit of the invention. Accordingly, the foregoing disclosure and description thereof are for illustrative purposes only and do not in anyway limit the invention which is defined only by the following claims.

I claim:

1. In a method of manufacturing capacitors wherein elongate thermoplastic dielectric films having a metal coating conductor associated therewith are wound into a coil and conductive metal electrodes are bonded to each axial end of such coil to form an electrical contact with the conductive windings, the steps in combination therewith comprising:

shaping an elongate conductor lead to form an L-shape having an elongate portion and a foot portion;

positioning said L-shaped lead against one of said electrodes so that said foot portion extends from near center of the axial end of said windings and radially outwardly therefrom to an outer circumferential edge of said one of said electrodes; and mechanically and electrically bonding said foot portion of said lead to said metal electrode by applying heat thereto, whereby any damage to the interface between said metal electrode and the conductive windings caused by the presence of heat during bonding of said lead is limited to brief segments of the full circumferential extent of each winding interface.

2. In the method of claim 1, wherein the step of bonding said conductive metal electrodes is by spraying a molten metal selected to have a relatively low melting point and exhibiting relatively low heat conduction capabilities, and said step of mechanically and electrically bonding said lead portion being accomplished by resistance soldering said portion to said sprayed metal electrode.

3. In the method of claim 1, said substep of shaping said conductor lead further comprising the substep of flattening said foot portion prior to said step of mechanically and electrically bonding said portion, whereby said application of heat thereto causes a more rapid melting and bonding of said lead portion to said metal electrode.

4. A method of manufacturing capacitors comprising:

winding a pair of dielectric films formed of a relatively low melting point thermoplastic material and having metallized surfaces into a cylindrical coil;

spraying molten metal having a relatively low melting point and exhibiting relatively low heat conduction onto the opposed axial ends of said cylindrical coil to form conductive metal electrodes bonded to the metallized surfaces of said dielectric film;

shaping an elongate conductor lead to form an L-shape having an elongate portion and a foot portion;

positioning said L-shaped lead against one of said electrodes so that said foot portion extends from near center of the axial end of said one of said electrodes and radially outwardly therefrom to an outer circumferential edge of said one of said electrodes; and electrically and mechanically soldering said foot portion to said sprayed conductive metal electrode by resistance heating of said lead portion, whereby any damage to the electrical bond between said conductive metal electrodes and the metallized surfaces of said thermoplastic dielectric films is limited to relatively small, discrete segments occupying a minor segment of the full circumferential extent of each winding.

5. The method of claim 4, wherein said relatively low melting point thermoplastic material is polypropylene and said sprayed electrode metal is a molten babbit metal.

6. The method of claim 4, wherein said thermoplastic material is selected from thermoplastics capable of being formed into a film and having a melting point in the range of 250°–360° F., and said sprayed metal has a melting point in the range of 440°–550° F.

7. A capacitor of the type formed by winding thermoplastic dielectric films having metallized surfaces into a cylindrical coil and applying conductive metal electrodes to the opposed axial ends of said cylindrical coil, having an improved lead wire connection thereto comprising:

a conductor formed in an L-shape and having an elongate portion and a foot portion with said conductor positioned so that said foot portion extends from near center of said conductive metal electrodes applied to the axial ends of said cylindrical coil and radially outwardly therefrom to an outer circumferential edge of said electrodes, said foot portion being heat bonded to the associated metal electrode such that any destruction or impairment of the electrical interface between said electrodes and the edges of said metallized surfaces of the windings by reason of said heat bonding of said lead wire portion is limited to a number of discrete segments occupying only a limited extent of the full circumference of each film winding and with each such discrete segment being electrically bridged by immediately adjacent undamaged electrical interfaces between the metal electrodes and the metallized film surfaces.

8. The capacitor of claim 7, wherein said thermoplastic films are formed of polypropylene and said metal electrodes are formed from a metal having a melting point of around 450° F.

9. The capacitor defined in claim 7, said L-shaped lead wire having its elongate foot portion flattened to facilitate the heat bonding of said lead wire portion to said metal electrode.

10. A capacitor of the type formed by winding thermoplastic dielectric films having metallized surfaces into a cylindrical coil and applying conductive metal electrodes to the opposed axial ends thereof, having an improved lead wire connection thereto comprising:

a quarter round head formed at one end thereof and being positioned with respect to the axial end of said wound films such that said quarter round head extends substantially radially outwardly from the center of said windings with no section of said quarter round head paralleling any one or more of said windings for more than 90° of the full circumference thereof, said quarter round head being heat bonded to the adjacent metal electrode such that any destruction or impairment of the electrical interface between the axial end electrodes and the edges of the metallized surfaces of the windings by reason of said heat bonding of said quarter round head being limited to a number of discrete segments occupying only a limited extent of the full circumference of each film winding and with each such discrete segment being electrically bridged by immediately adjacent undamaged electrical interfaces between the metal electrodes and the metallized film surfaces.

11. A capacitor of the type formed by winding thermoplastic dielectric films having metallized surfaces into a cylindrical coil and applying conductive metal electrodes to the opposed axial ends thereof, having an improved lead wire connection thereto comprising:

a T-shaped head formed at one end thereof and being positioned with respect to the axial end of said wound films such that said T-shaped head extends radially from the near center of one of said electrodes applied to said axial ends of said cylindrical coil of said capacitor, said T-shaped head being heat bonded to the adjacent metal electrode such that any destruction or imprairment of the electrical interface between the axial end electrodes and the edges of the metallized surfaces of the windings by reason of said heat bonding of said T-shaped head is limited to a number of discrete segments occupying only a limited extent of the full circumference of each film winding and with each such discrete segment being electrically bridged by immediately adjacent undamaged electrical interfaces between the metal electrodes and the metallized film surfaces.

12. A capacitor of the type formed by winding thermoplastic dielectric films having metallized surfaces onto a cylindrical coil and applying conductive metal electrodes to the opposed axial ends thereof, having an improved lead wire connection thereto comprising:

a pair of angularly set radially extending foot portions with each foot portion extending from the near center of one of said electrodes applied to said axial ends of said cylindrical coil of said capacitor, said pair of angularly set foot portions being heat bonded to the adjacent metal electrode such that any destruction or impairment of the electrical interface between the axial end electrodes and the edges of the metallized surfaces of the windings by reason of said heat bonding of said angularly set foot portions is limited to a number of discrete segments occupying only a limited extent of the full circumference of each film winding and with each such discrete segment being electrically bridged by immediately adjacent undamaged electrical interfaces between the metal electrodes and the metallized film surfaces.

13. A capacitor of the type formed by winding thermoplastic dielectric films having metallized surfaces into a cylindrical coil and applying conductive metal electrodes to the opposed axial ends thereof, having an improved lead wire connection thereto comprising:

an L-shaped head having a foot portion formed at one end and positioned with respect to the axial end of said wound films across the diameter of one of said electrodes applied to said axial ends of said wound films of said capacitor, said L-shaped head being heat bonded to the adjacent metal electrode such that any destruction or impairment of the electrical interface between the axial end electrodes and the edges of the metallized surfaces of the windings by reason of said heat bonding of said lead foot portion is limited to a number of discrete segments occupying only a limited extent of the full circumference of each film winding and with each such discrete segment being electrically bridged by immediately adjacent undamaged electrical interfaces between the metal electrodes and the metallized film surfaces.

* * * * *